Dec. 27, 1932.  J. STEIN  1,892,085
DECORATED MOLDED RUBBER AND METHOD OF PRODUCING SAME
Filed Jan. 2, 1930
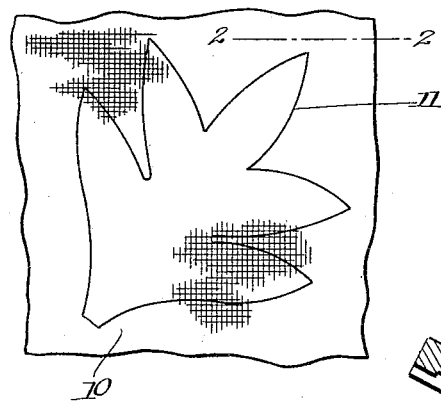
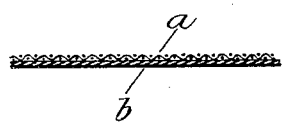
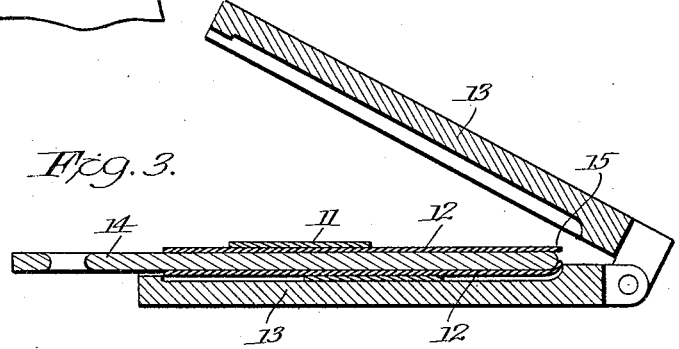
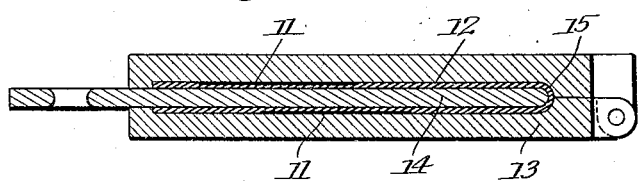
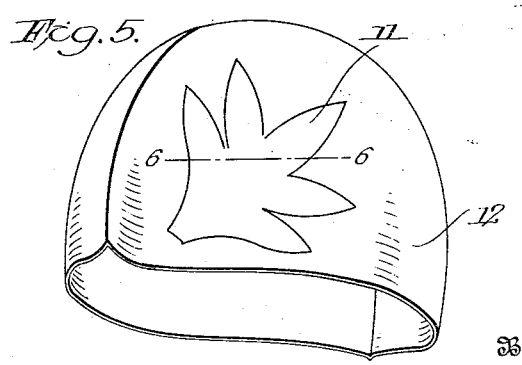
Inventor
Jacob Stein,
By Patented Dec. 27, 1932

1,892,085

UNITED STATES PATENT OFFICE

JACOB STEIN, OF BROOKLYN, NEW YORK

DECORATED MOLDED RUBBER AND METHOD OF PRODUCING SAME

Application filed January 2, 1930. Serial No. 418,111.

The present invention relates to molded rubber goods having a decorative design of definite outline or configuraton molded or integrally incorporated in the material of the molded article in contra-distinction to impressed designs or configurations, or those secured by an adhesive or the like.

While the invention is of general application to all molded rubber articles, for the purpose of the present disclosure the invention is shown and described in connection with bathing caps, which are desirable articles for ornamental decoration.

Molded rubber articles are usually formed by placing uncured rubber in a mold, of a shape or design to produce the desired article being manufactured, and subjecting the mold and its contents to pressure and heat of the required amount and degree, which renders the rubber molten or plastic so that it will assume the shape of the mold. If the surfaces of the mold are ornamentally engraved or otherwise designed, the configuration or ornamentation is impressed on opposing surfaces of the rubber material.

So far as the applicant is aware, rubber designs of definite outline and contrasting color have not been incorporated in the molded rubber articles, because, due to the heat and pressure above referred to, the raw or uncured rubber forming the design would run or flow, that is to say, that the edge of the configuration would be distorted, destroying the decorative value of the design, and in many instances producing a third color due to the intermingling or mixture of the rubber used to form the body of the article and of rubber forming the design.

The object of the present invention is the provision of molded rubber goods having a rubber design of contrasting color homogeneously incorporated in the molded article, and in the provision of a simple, economical and effective method to accomplish this purpose, all of which are hereinafter described and particularly defined in the appended claims.

In order that the manner of carrying out the process may be better understood, the annexed drawing is referred to, in which—

Fig. 1 is a plan view of the material from which the decorative design is cut and provided;

Fig. 2 is a sectional view taken substantially on line 2—2 of Fig. 1 in order to show the construction or character of the decorative material;

Fig. 3 shows a mold for molding bathing caps, and further illustrates the body material of the cap and the decorative design positioned in the mold;

Fig. 4 is a view similar to Fig. 3 except it shows the mold in closed position and after it has been subjected to heat and pressure;

Fig. 5 is a perspective view of the cap resulting from the molding process and after having been removed from the mold; and Fig. 6 is a fragmentary sectional view taken substantially on line 6—6 of Fig. 5.

In proceeding according to the present invention, the decorative design which is to be incorporated in the molded article is cut from a sheet or piece of rubberized goods 10, preferably of a flexible nature, such as cloth, textile fabric or knitted cloth, to produce a decoration 11 of any desired design, shape or contour. This material 10 is, as above stated, a rubberized cloth which is commonly known in the art and comprises a cloth or fabric layer $a$ and a rubber layer or surface $b$ of a color or colors which will contrast with the color of the article on which it is to be placed.

These decorative designs 11 are then placed in the mold with their cloth surface $a$ opposing the rubber 12 which is to form the body of the molded article.

In the case of the manufacture of bathing caps, it is generally the practice to die out two similar sections of sheet rubber 12 which are to form opposite sides of the cap. In order to facilitate the disposition of the decorative pieces 11 on the cap, these latter pieces may be positioned in the desired arrangement on the outer faces of the sheet sections 12 and temporarily secured thereto by means of so-called rubber stitching (which consists in merely pressing the part 11 onto the uncured rubber sheet 12), or by means of spotting with an adhesive. The sheets 12 with the decorative pieces 11 thereon are then placed into a mold, as shown in Fig. 3, having a core 14 separating the two sheets 12, except at the edges of the sheets which are to be joined together in the molding operation.

After the parts are assembled in the mold, the mold is closed and subjected to a molding operation, under heat and pressure, which causes the sheets 12 to be united at their edges 15 and to fuse with the decorative lamina 11 which becomes an homogeneous part thereof. The heat and pressure causes the rubber of the sheets 12 to flow in the interstices of the cloth surface $a$ of the decorative design 11 and unite with rubber $b$ thereof.

After the above operation, the article is removed from the mold and allowed to cool.

The cloth $a$ of the decorative piece 11 serves to retain the definite outline of the original design by preventing distortion of the design under heat and pressure and by preventing the rubber surface $b$ thereof from flowing over at the edges of the design. The rubber surface $b$ of the decorative design, if desired, may be partly or semi-cured in order to eliminate all danger of the plastic rubber 12, when under heat and pressure, from flowing therethrough or commingling therewith so as to discolor the decorative design, which, as has been said before, is of a contrasting color to that of the body of the article.

The cap as a finished product is shown in Fig. 5 with the decorative rubber design 11 of contrasting color embedded in the body material in a homogeneous integral manner.

It is found advantageous to have the fabric body $a$ of the decorative sheet 11 of a knitted cloth so that the area of the cap or other article covered by the decoration will have a large degree of stretchability or resiliency.

Of course, when the rubberized cloth is semi-cured, for the reasons mentioned, the rubber 12 which composes the body of the article will be accelerated to cure evenly, or substantially so, with the rubber of the design when molded, for reasons well understood in the art.

It is also understood that while the invention is described in connection with rubber bathing caps, it is not limited in this respect, but is applicable to the manufacture of any article of a similar or analogous nature; and furthermore the method or construction described may be varied within the scope of the appended claims.

Having thus described the invention, and in what manner the same is to be performed, what is claimed as novel upon which Letters Patent is prayed is as follows:—

1. The method of decorating molded rubber articles with designs of definite shape and contrasting color, which includes producing a decorated design from a sheet of rubberized fabric having a rubber surface and a cloth surface, arranging said design of contrasting color with respect to the rubber stock which is to form the body of the article so that the design will be between said stock and the mold with the cloth surface of the design opposing said rubber stock, and subjecting the mold and its contents to a molding operation.

2. The method of decorating molded articles with designs of definite shape and contrasting color, which includes providing a design of rubberized fabric, arranging the design and the rubber stock to form the body of the article both of different color in a mold so that the design will oppose the outer surface of the rubber body stock with the rubberized surface of the design outermost, and subjecting the mold and its contents to a rubber molding operation.

3. The method of producing decorated molded bathing caps consisting in producing decorated designs of color contrasting with that of the body of the cap from a sheet of rubberized fabric, providing sections of sheet rubber to form component parts of the bathing cap, temporarily securing one or more of said designs to the surfaces of one or more of said sections, which surfaces will form the outer face of the bathing cap, assembling said sections of the bathing cap in a mold, then subjecting the mold and its contents to a rubber molding operation, whereby the designs will be molded into the outer surface of the bathing cap and be homogeneous therewith.

4. A molded rubber article comprising a body of molded rubber stock, a rubber decoration of contrasting color and definite design having a textile material incorporated therein, said decoration being molded in and homogeneously incorporated in the outer surface of the rubber stock forming the body of the article.

5. A molded rubber article comprising a body of molded rubber stock, a rubber decoration of contrasting color and definite design having a textile material incorporated therein, said decoration being molded in and homogeneously incorporated in the outer surface of the rubber stock forming the body of the article, said textile material of the decoration being stretchably resilient with the rubber of the article.

In testimony whereof I have hereunto set my hand.

JACOB STEIN.